United States Patent
O'Donnell (10) Patent No.: US 10,955,134 B2
(45) Date of Patent: Mar. 23, 2021

(54) BURNER WITH VARIABLE PORT AREA

(71) Applicant: BECKETT GAS, INC., North Ridgeville, OH (US)

(72) Inventor: Michael J. O'Donnell, Avon, OH (US)

(73) Assignee: BECKETT GAS, INC., North Ridgeville, OH (US)

( * ) Notice: Subject to any disclaimer, the term of this patent is extended or adjusted under 35 U.S.C. 154(b) by 181 days.

(21) Appl. No.: 16/233,219

(22) Filed: Dec. 27, 2018

(65) Prior Publication Data

US 2019/0128516 A1 May 2, 2019

Related U.S. Application Data

(63) Continuation-in-part of application No. 15/358,221, filed on Nov. 22, 2016, now Pat. No. 10,634,354, which is a continuation-in-part of application No. 14/238,067, filed as application No. PCT/US2012/050278 on Aug. 10, 2012, now abandoned.

(60) Provisional application No. 62/612,862, filed on Jan. 2, 2018, provisional application No. 61/522,412, filed on Aug. 11, 2011, provisional application No. 61/602,261, filed on Feb. 23, 2012.

(51) Int. Cl.
| | |
|---|---|
| *F23D 14/02* | (2006.01) |
| *F23D 14/60* | (2006.01) |
| *F02C 3/14* | (2006.01) |
| *F23R 3/00* | (2006.01) |

(52) U.S. Cl.
CPC .............. *F23D 14/60* (2013.01); *F02C 3/14* (2013.01); *F23D 14/02* (2013.01); *F23R 3/00* (2013.01); *F23N 2900/00* (2013.01); *Y02T 50/60* (2013.01)

(58) Field of Classification Search
CPC .. F23R 3/00; F23R 3/286; F23R 3/002; F23R 3/12; F23R 3/28; F23R 3/38; F23R 3/50; F23D 14/60; F23D 14/58; F23D 14/70; F23D 14/02; F23D 14/10; F23D 2203/1012; F23D 2900/00003; F23D 2900/14021; F23D 2203/102; F23N 2900/00; F02C 3/14; F02C 3/04; Y02T 50/671; Y02T 50/60; Y02T 50/675; F05D 2220/32
See application file for complete search history.

(56) References Cited

U.S. PATENT DOCUMENTS 2,718,757 A * 9/1955 Bloomer .................. F23R 3/12
60/737
2,837,893 A * 6/1958 Schirmer .................. F23R 3/26
60/39.23

(Continued)

*Primary Examiner* — Alfred Basichas
(74) *Attorney, Agent, or Firm* — Tarolli, Sundheim, Covell & Tummnio LLP (57) ABSTRACT

A fuel burner includes a tube extending from a first end to a second end and including a central passage and fluid directing structure for directing a mixture of air and combustible fuel radially through the tube. The fluid directing structure collectively defines a total flow area. A blocking member is axially movable within the central passage between a first condition blocking a first percentage of the total flow area and a second condition blocking a second percentage of the total flow area different from the first percentage to control the flow of the mixture of air and combustible fuel through the fluid directing structure from the first end to the second end of the tube to be ignited.

19 Claims, 12 Drawing Sheets

(56) References Cited

U.S. PATENT DOCUMENTS

| | | | | |
|---|---|---|---|---|
| 4,519,770 | A | * | 5/1985 | Kesselring ............. F23D 14/18 122/4 D |
| 4,996,838 | A | * | 3/1991 | Melconian ............... F23R 3/58 60/732 |
| 5,240,411 | A | * | 8/1993 | Abalos ................. F23D 14/145 126/92 AC |
| 5,888,059 | A | * | 3/1999 | Edwards .............. B05B 7/0475 239/403 |
| 6,623,267 | B1 | * | 9/2003 | Golladay, Jr. ........... F23D 14/02 239/406 |
| 10,634,354 | B2 | * | 4/2020 | O'Donnell ............... F02C 3/14 |

* cited by examiner

BURNER WITH VARIABLE PORT AREA

RELATED APPLICATIONS

This application claims the benefit of U.S. Provisional Application No. 62/612,862, filed Jan. 2, 2018; U.S. application Ser. No. 15/358,221, filed Nov. 22, 2016; U.S. application Ser. No. 14/238,067, filed Feb. 10, 2014; International Application No. PCT/US2012/050278, filed Aug. 10, 2012; U.S. Provisional Application No. 61/602,261, filed Feb. 23, 2012; and U.S. Provisional Application No. 61/522,412, filed Aug. 11, 2011, the entirety of which are incorporated herein by reference.

TECHNICAL FIELD

The invention relates to a fuel burner and, in particular, relates to a fuel burner that can vary the port area through which a mixture of air and fuel flows to be ignited.

BACKGROUND

Some combustion/heating systems benefit from burners that can operate properly over a wide range of Btu inputs. These are often referred to as "high turndown" burners. One example would be a heater that takes in outside air and heats it up to a desired temperature before discharging it into the conditioned space. The outside air could be just a few degrees below the heating set point, to sub-zero temperatures or anywhere in between. The amount of heat required to raise the air to the desired discharge temperatures, however, will vary greatly between these different conditions.

Burners are typically designed to work well at a single, specific Btu input. Most burners will operate within some range above and below the nominal, but this range tends to be rather limited. Operating too high above the nominal can cause flame lifting and poor combustion (high carbon monoxide). Operating too far below the nominal can cause overheating of the burner. These undesirable operating characteristics are caused by the relationship between port velocity and flame speed. As the input increases, the volume of the gas/air mixture increases, which in turn causes the gas/air mixture port exit velocity to increase. When the port velocity decreases (flame speed remains the same), the flame gets closer to the burner surface, which can potentially cause overheating.

SUMMARY OF THE INVENTION

In one example, a fuel burner includes a tube extending from a first end to a second end and having a central passage and fluid directing structure for directing a mixture of air and combustible fuel radially through the tube. The fluid directing structure collectively defines a total flow area. A blocking member is axially movable within the central passage between a first condition blocking a first percentage of the total flow area and a second condition blocking a second percentage of the total flow area different from the first percentage to control the flow of the mixture of air and combustible fuel through the fluid directing structure from the first end to the second end of the tube to be ignited.

In another example, a fuel burner includes an outer tube extending along a central axis and having an outer surface and an inner surface defining a passage. An inner tube is provided within the passage of the outer tube and has an outer surface and an inner surface defining a central passage. A fluid passage is defined between the outer surface of the inner tube and the inner surface of the outer tube. The fluid passage is supplied with a mixture of air and combustible fuel. The inner tube has fluid directing structure for directing the mixture from the fluid passage to the central passage such that the mixture rotates radially about the central axis. The fluid directing structure defines a total flow area. A blocking member is axially movable within the central passage between a first condition blocking a first percentage of the total flow area and a second condition blocking a second percentage of the total flow area different from the first percentage.

Other objects and advantages and a fuller understanding of the invention will be had from the following detailed description of the preferred embodiments and the accompanying drawings.

BRIEF DESCRIPTION OF THE DRAWINGS

FIGS. 3A-4D are enlarged views of portions of alternative fluid directing structure of the fuel burner of FIG. 1.

DETAILED DESCRIPTION

The invention relates to a fuel burner and, in particular, relates to a fuel burner that can vary the port area through which a mixture of air and fuel flows to be ignited. The fuel burner can be used in industrial, household, and commercial appliances such as, for example, a water heater, boiler, furnace, etc., having an input of up to about 1M Btu.

Figure 1:
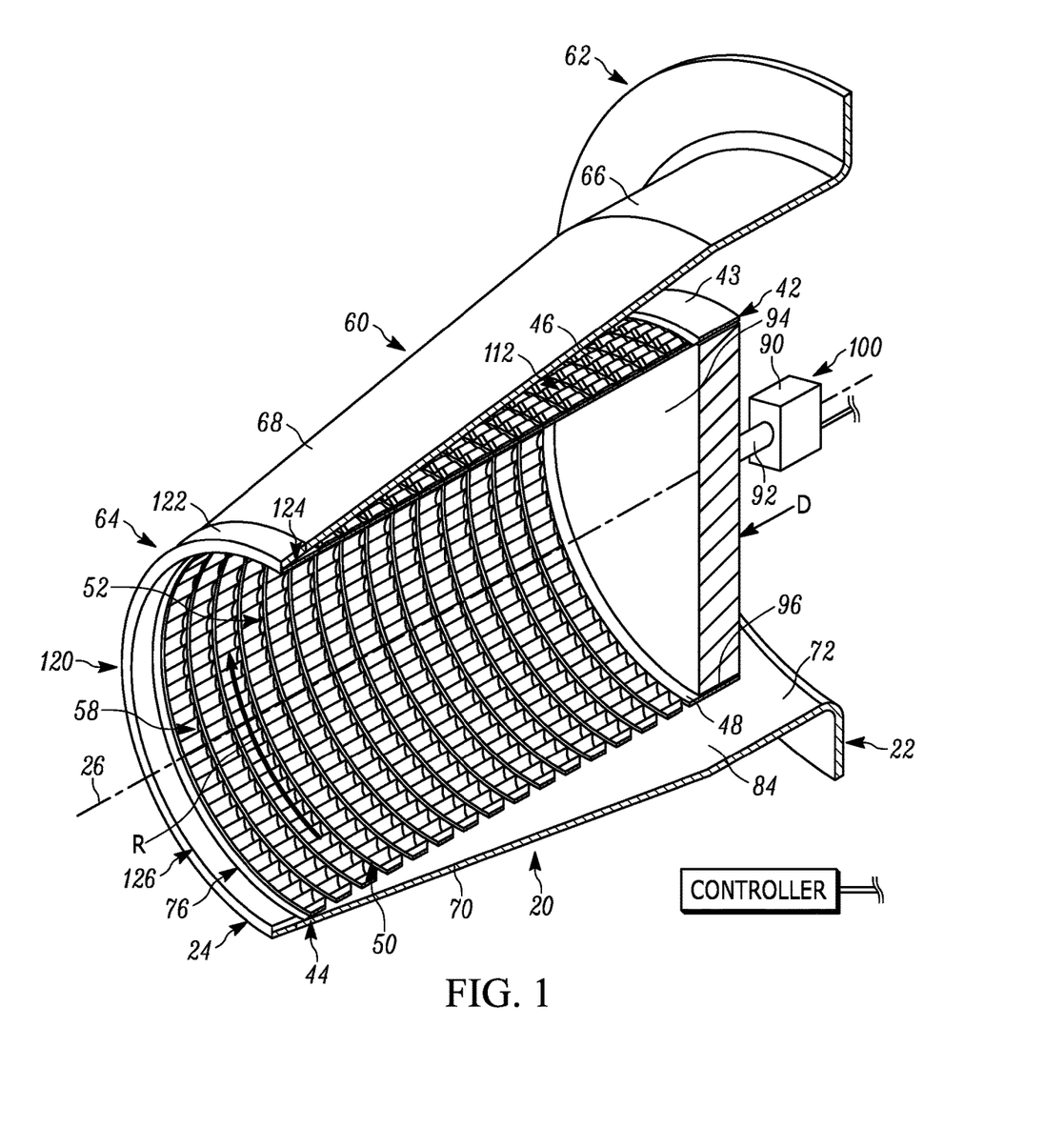
FIG. 1 is a schematic illustration of an example fuel burner having a port area adjusting device.

FIG. 1 illustrates an example fuel burner 20 that extends along a central axis 26 from a first end 22 to a second end 24. The fuel burner 20 includes a first, inner housing or tube 40 and a second, outer housing or tube 60. The inner tube 40 and the outer tube 60 are concentric with one another and are centered about the central axis 26. The inner tube 40 has a tubular shape and extends along the central axis 26 of the fuel burner 20 from a first end 42 to a second end 44. Although the inner tube 40 is illustrated as having a circular cross-section, it will be appreciated that the inner tube can exhibit alternative cross-sections, such as triangular, square, oval or any polygonal shape.

The inner tube 40 includes an outer surface 46 and an inner surface 48 that defines a central passage 50. The central passage 50 extends through the inner tube 40 and terminates at an opening 58 at the second end 44 of the inner tube. The inner tube 40 is made from a durable, flame-resistant material, such as metal. The inner tube 40 has a substantially constant cross-section and a constant inner diameter as illustrated in FIG. 1.

The space between the inner and outer tubes 40, 60 defines a fluid passage 112 for receiving fuel and air. The periphery of the inner tube 40 includes fluid directing structure 52 for directing fluid to the central passage 50. As shown in FIG. 1, the fluid directing structure 52 is configured to direct the air/fuel mixture to the central passage 50 in a direction that is offset/angled from the central axis 26 of the fuel burner 20 and along a path that is angled relative to the normal of either surface 46 or 48 of the inner tube. A portion 43 of the first end 42 of the inner tube 40 upstream of the fluid directing structure 52 does not include fluid directing structure.

Figure 2A:
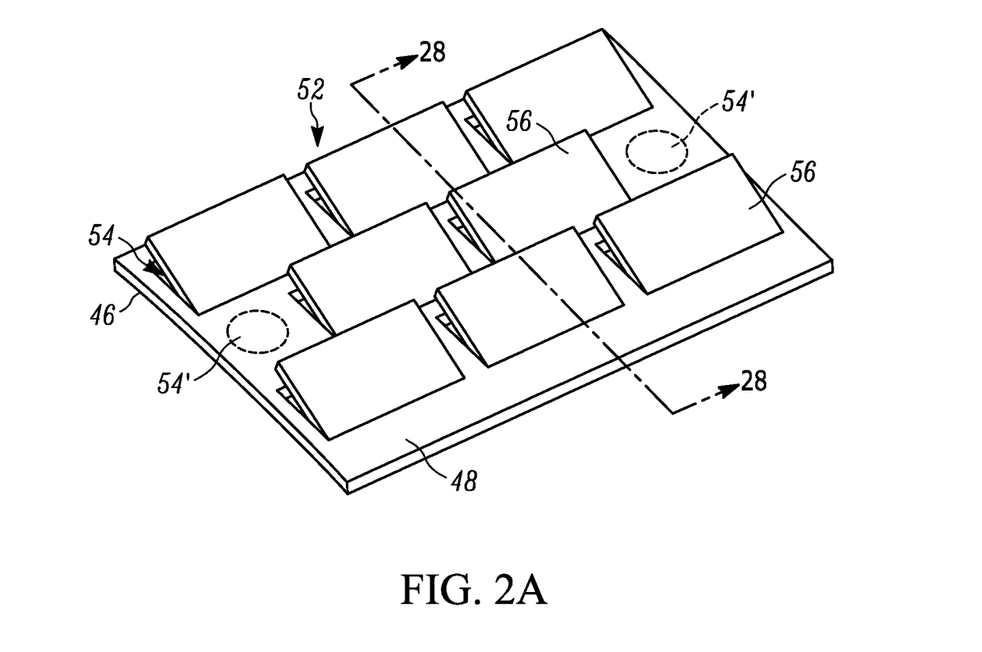
FIG. 2A is an enlarged view of a portion of fluid directing structure of the fuel burner of FIG. 1.

The fluid direction structure 52 can include a series or openings with associated fins or guides for directing the fluid in the desired manner (FIGS. 2A-3D). As shown in FIGS. 2A-B, the fluid directing structure 52 includes a plurality of openings 54 in the inner tube 40 for allowing the air/fuel mixture to pass from the fluid passage 112 to the central passage 50 of the inner tube. Each of the openings 54 extends entirely through the inner tube 40 from the outer surface 46 to the inner surface 48. Each opening 54 can have any shape, such as rectangular, square, circular, triangular, etc. The openings 54 can all have the same shape or different shapes.

Figure 2B:
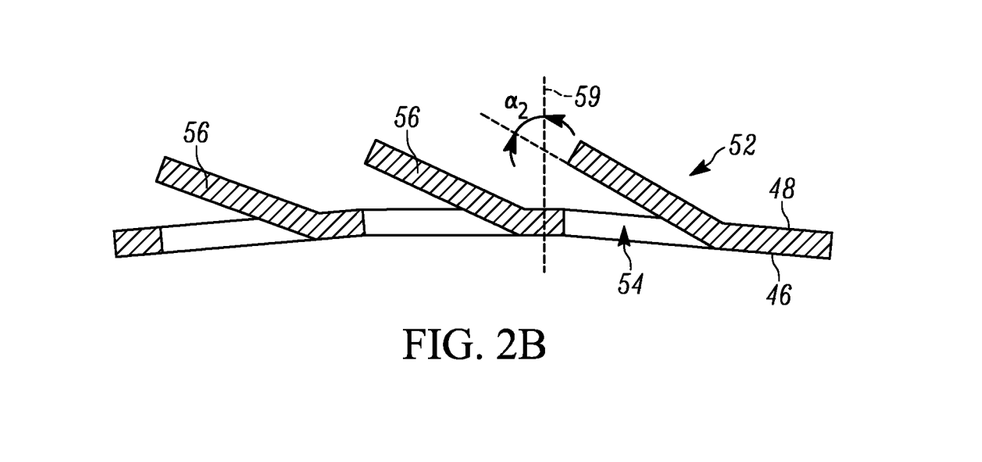
FIG. 2B is a section view of FIG. 2A taken along line 2B-2B.

The openings 54 are aligned with one another along the periphery, i.e., around the circumference, of the inner tube 40 to form an endless loop. One or more endless loops of openings 54 can be positioned adjacent to one another or spaced from one another along the length of the inner tube 40. Each loop can have any number of openings 54. The openings 54 in adjacent loops can be aligned with one another or can be offset from one another. The size, shape, configuration, and alignment of the openings 54 in the inner tube 40 is dictated by desired flow and performance characteristics of the air/fuel mixture flowing through the openings. Although the openings 54 are illustrated as being arranged in a predetermined pattern along the inner tube 40, it will be appreciated that the openings can be randomly positioned along the inner tube (not shown).

Each opening 54 includes a corresponding fluid directing projection or guide 56 for directing the air/fuel mixture passing through the associated opening radially inward into the central passage 50 in a direction that is offset from the central axis 26 of the fuel burner 20, i.e., a direction that will not intersect the central axis. The guides 56 are formed in or integrally attached to the inner tube 40. Each guide 56 extends at an angle (shown in FIG. 2B), relative to the outer surface 46 the inner tube 40. The guides 56 can extend at the same angle or at different angles relative to the outer surface 46 of the inner tube 40. Each guide 56 extends at an angle, indicated at $\alpha_2$, relative to an axis 59 extending normal to the inner surface 48 of the inner tube 40. Although the figures show all of the openings being designed to guide the air/fuel mixture in a direction that is offset from the central axis 26 of the burner, it should be noted that openings with other configurations can be used. For example, straight through openings, pointing at the central axis 26 (indicated in phantom by the reference character 54' in FIG. 2A) can be interspersed with guided openings 54 to achieve the same overall swirling effect.

FIGS. 3A-D illustrate alternative configurations of the fluid directing structure 52 in the inner tube 40 in accordance with the present invention. The fluid directing structure 52a-52d directs the incoming air/fuel mixture radially inward toward the central passage 50 and in a direction that is 1) offset from the central axis 26 and 2) angled relative to the normal of either surface 46 or 48 of the inner tube 40 such that the air/fuel mixture exhibits a swirling, rotational path around the central axis while becoming radially layered relative to the central axis. The openings 54, 54' in the fluid directing structure can be randomly positioned along the inner tube 40 or can be arranged in any predetermined pattern dictated by desired flow and performance criterion.

Figure 3A:
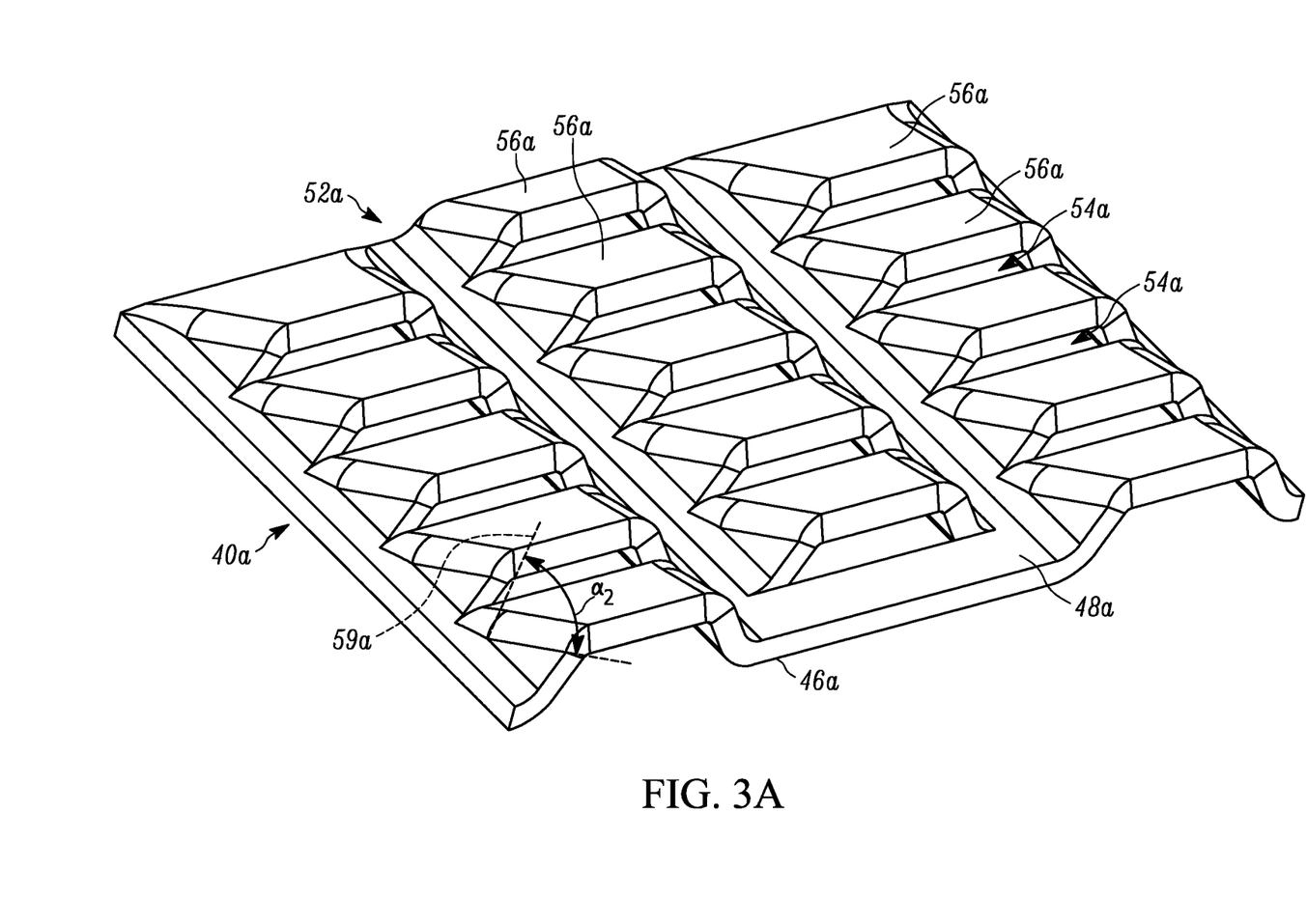

In FIG. 3A, the fluid directing structure 52a includes a plurality of guides 56a that define openings 54a in the inner tube 40a. The guides 56a are arranged in a series of rows that extend around the periphery of the inner tube 40a. The annular rows are positioned next to one another along the length of the inner tube 40a. The guides 56a of adjacent rows can be radially offset from one another or can be radially aligned with one another (not shown). The guides 56a in each row can be similar or dissimilar to one another. The guides 56a direct the air/fuel mixture passing through the openings 54a in a radially inward direction that is offset from the central axis 26 and at an angle $\alpha_2$ relative to the axis 59a extending normal to the outer surface 46a of the inner tube 40a. If the guides 56a within a row are fully or partially aligned with one another around the periphery of the inner tube 40a, the air/fuel mixture exiting each guide in that row is further guided in a direction offset from the central axis 26 by the rear side of the adjacent guide(s) in the same row.

Figure 3B:
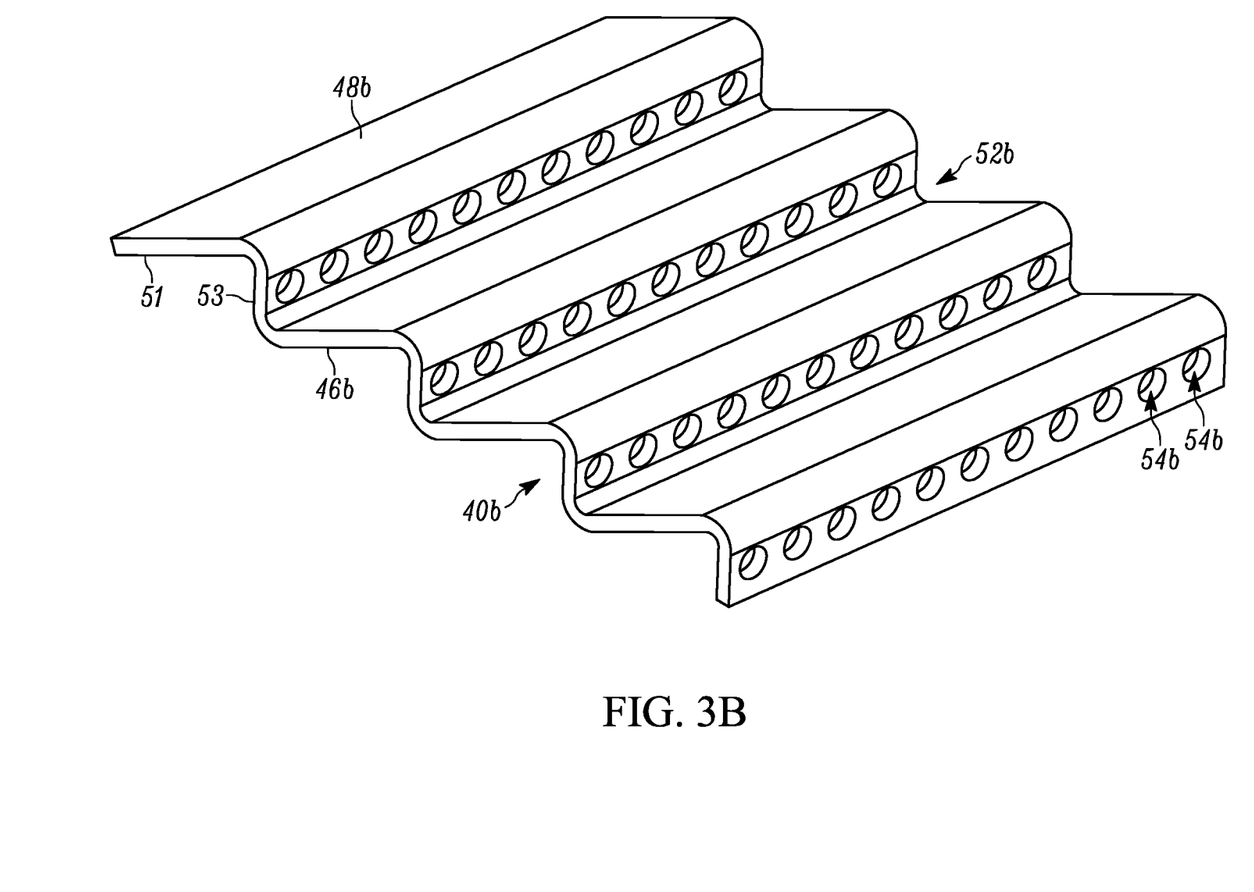

In FIG. 3B, the inner tube 40b is formed as a series of steps that each includes a first member 51 and a second member 53 that extends substantially perpendicular to the first member to form an L-shaped step. The second member 53 of each step includes a plurality of openings 54b for directing the air/fuel mixture in a direction that is offset from the central axis 26 and angled relative to the axis (not shown) extending normal to the outer surface 46b of the inner tube 40b. In particular, the openings 54b in each second member 53 direct the air/fuel mixture across the first member 51 of the adjoining step to impart rotation to the air/fuel mixture and, thus, to the air/fuel mixture within the central passage 50 about the central axis 26.

Figure 3C:
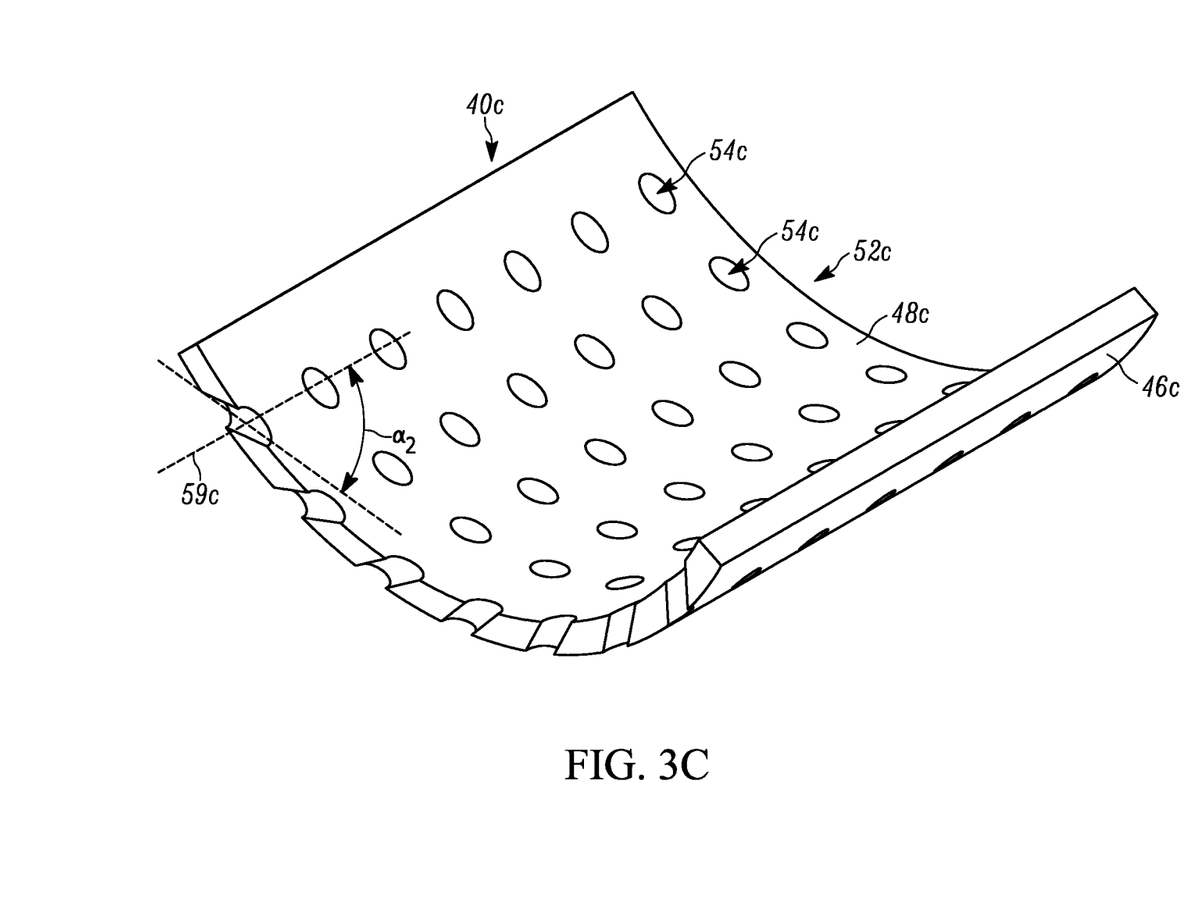

In FIG. 3C, the fluid directing structure 52c includes a plurality of openings 54c that extend from the outer surface 46c of the inner tube 40c to the inner surface 48c. The openings 54c extend through the inner tube 40c at an angle relative to the axis 59c extending normal to the outer surface 46c of the inner tube 40c and through the central axis 26 of the fuel burner 20. The openings 54c in the inner tube 40c direct the air/fuel mixture in a direction that is offset from the central axis 26 and at an angle relative to the axis 59c in order to impart rotation to the air/fuel mixture within the central passage 50 about the central axis.

Figure 3D:
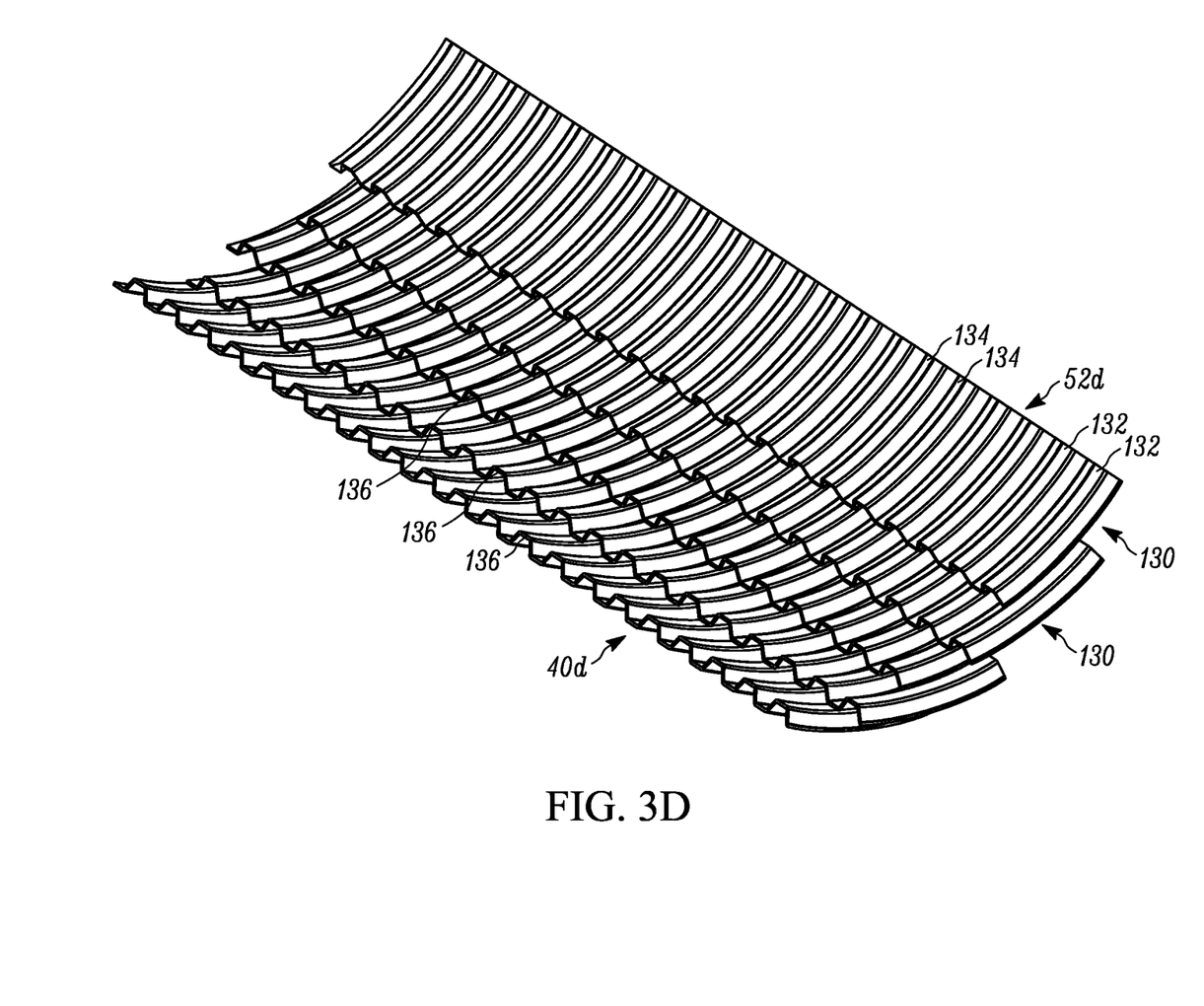

In FIG. 3D, the fluid directing structure 52d is formed by a series of arcuate, overlapping plates 130 that cooperate to form the inner tube 40d. Each plate 130 has a corrugated profile that includes peaks 132 and valleys 134. The plates 130 are longitudinally and radially offset from one another such that that peaks 132 of one plate 130 are spaced between the peaks of adjacent plates. In this configuration, the peaks 132 and valleys 134 of the plates create passages 136 through which the air/fuel mixture is directed. Each plate 130 directs the air/fuel mixture in a direction that extends substantially parallel to the adjoining arcuate plate to impart rotation to the air/fuel mixture and, thus, to the air/fuel mixture about the central axis 26. The air/fuel mixture within the central passage 50 is thereby directed in a direction that is offset from the central axis 26 of the fuel burner 20 and angled relative to the axis (not shown) extending normal to the plates 130.

Regardless of the specific configuration used, the fluid directing structure 52-52d—via the openings 54, 54'—defines a total flow or port area through which the air/fuel mixture can flow along the entire length and circumference of the inner tube 40 radially inward to the central passage 50. In other words, the cumulative size of the openings 54, 54' along the entire length and circumference of the inner tube 40 defines a total port area through which the air/fuel mixture can pass from the fluid passage 112 to the central passage 50.

As shown in FIG. 1, the outer tube 60 extends along the central axis 26 of the fuel burner 20 from a first end 62 to a second end 64. Although the outer tube 60 is shown as having a generally circular cross-section, it will be appreciated that the outer tube can exhibit any cross-section, which can be the same as or different from the shape of the inner tube 40. The outer tube 60 includes axially aligned first and second portions 66 and 68, respectively. The first portion 66 has a tubular shape and the second portion 68 has a frustoconical shape that tapers radially inward in a direction extending towards the second end 64 of the outer tube. It will be appreciated, however, that either or both the first portion 66 and the second portion 68 of the outer tube 60 can have a tapered or untapered shape (not shown). The outer tube 60 includes an outer surface 70 and an inner surface 72 that defines a passage 74 extending through the outer tube from the first end 62 of the outer tube to an opening 76 in the second end 64 of the outer tube.

A cap 120 is integrally formed with or secured to the inner tube 40 and secures the inner tube to the outer tube 60. The cap 120 can seal the interface between the tubes 40, 60 in a gas-tight manner, a fluid-tight manner or in a manner that allows for a small percentage of fluid leakage through the interface, e.g., less than about 10% or less than about 1% of the fluid flow. The cap 120 is formed on the second end 44 of the inner tube 40 and is secured to the second end 64 of the outer tube 60 such that the inner tube extends into the passage 74 of the outer tube towards the first end 62 of the outer tube. The cap 120 has an annular shape and includes a wall 122 that exhibits a U-shaped configuration. The wall 122 defines a passage 124 for receiving the second end 64 of the outer tube 60. The wall 122 also defines a central opening 126 that is aligned with the opening 58 in the inner tube 40 and the opening 76 in the outer tube 60.

The burner 20 includes a port area adjustment device 100 configured to vary the length of the inner tube 40 capable of directing the air/fuel mixture from the fluid passage 112 to the central passage 50 by selectively blocking a portion of the fluid directing structure 52. The device 100 includes a blocking member 94 positioned within the central passage 50 at the first end 42 of the inner tube 40 and closing the first end of the inner tube. To this end, the blocking member 94 includes an outer surface 96 that forms a seal or substantial seal with the portion 43 of the inner tube 40. The outer surface 96 can seal the interface between the blocking member 94 and the inner tube 40 in a gas-tight manner, a fluid-tight manner or in a manner that allows for a small percentage of fluid leakage through the interface, e.g., less than about 10% or less than about 1% of the fluid flow.

The blocking member 94 closes the first end 42 of the inner tube 40 to prevent the incoming fuel/air mixture from axially entering the central passage 50 of the inner tube. In another example, a separate end wall (not shown) can be rigidly fixed to the first end 42 and seal with the first end to prevent axial flow of the air/fuel mixture into the central passage 50. In such a construction, the blocking member 94 is positioned upstream of the end wall 80 within the central passage 50.

A linear actuator 90, e.g., stepper motor, is positioned upstream of the blocking member 94 and includes a rod 92, e.g., jackscrew, connected to the blocking member. The linear actuator 90 is selectively actuated to move the blocking member 94 within the central passage 50 and towards the second end 44 of the inner tube in the direction/manner indicated generally by the arrow D.

When the fuel burner 20 is assembled, the cap 120 securely connects the second end 44 of the inner tube 40 to the second end 64 of the outer tube 60 such that the inner tube extends within the passage 74 of the outer tube and along the central axis 26 of the fuel burner. In this configuration, the outer surface 46 of the inner tube 40 is positioned radially inward of the inner surface 72 of the outer tube 60 such that a portion of the passage 74 between the outer surface of the inner tube and the inner surface of the outer tube defines the fluid passage 112. The fluid passage 112 is in fluid communication with the fluid directing structure 52 in the inner tube 40 and, thus, is in fluid communication with the central passage 50 of the inner tube.

In the illustrated embodiment, the inner tube 40 has a constant cross-section and the second portion 68 of the outer tube 60 has a frustoconical cross-section that tapers radially inward in a direction extending towards the second end 64 of the outer tube. As a result, the fluid passage 112 likewise has a cross-section that tapers radially inward in a direction extending towards the second end 64 of the outer tube 60. Alternatively, if the second portion 68 of the outer tube 60 is not tapered (not shown), the fluid passage 112 will have a constant cross-section along its length.

A supply of air and combustible fuel is delivered to the outer tube 60, which then flows into the passage 74 of the outer tube. In one example, the air and fuel are pre-mixed upstream of one or both of the inner and outer tubes 40, 60. Any number of pre-mixing systems which are well known in the art can be used. Alternatively, the air and fuel mixture is mixed within the combustion chamber (not shown).

Figure 4:
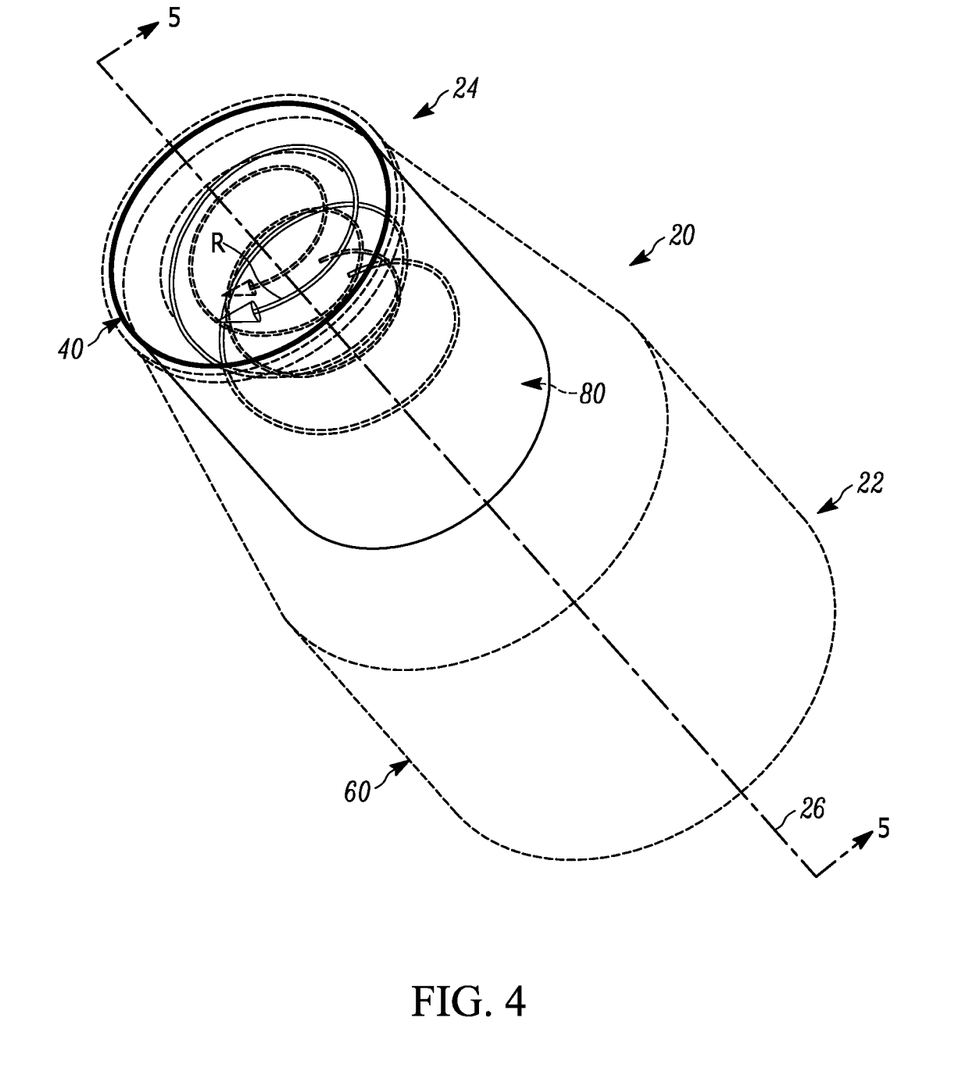
FIG. 4 is a schematic illustration of an air/fuel mixture traveling through the fuel burner of FIG. 1.

In operation, the pre-mixing system (not shown) upstream of the fuel burner 20 supplies a mixture of air and fuel to the fuel burner and delivers the mixture as a stream to the passage 74 of the outer tube 60. The air/fuel mixture stream is delivered in the general direction D into the fluid passage 112 between the inner tube 40 and the outer tube 60. The blocking member 94 prevents all or substantially all of the air/fuel mixture from passing axially directly into the central passage 50.

Figure 5:
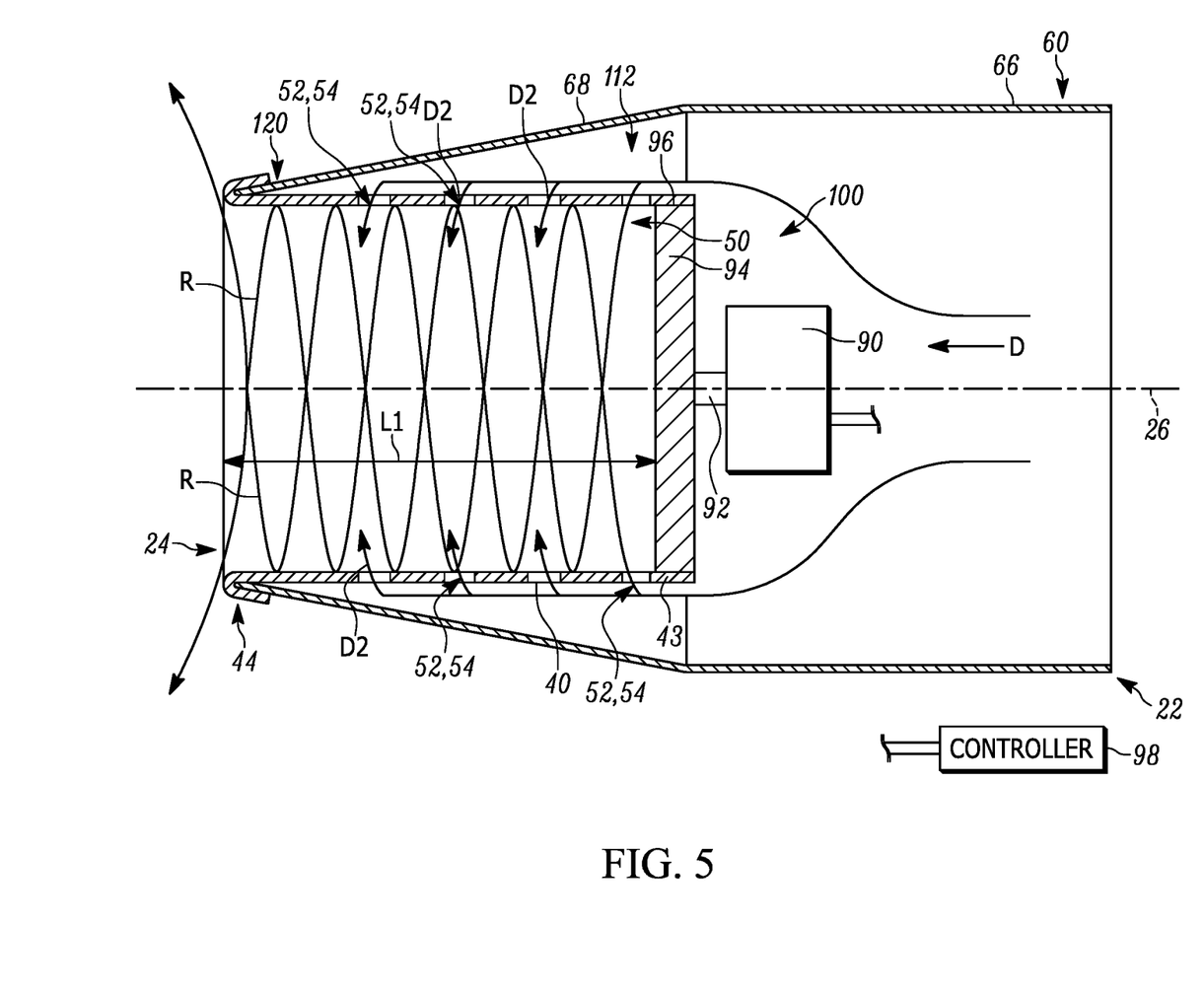
FIG. 5 is a section view of FIG. 4 taken along line 5-5 with the port area adjusting device in a first condition.
Figure 6:
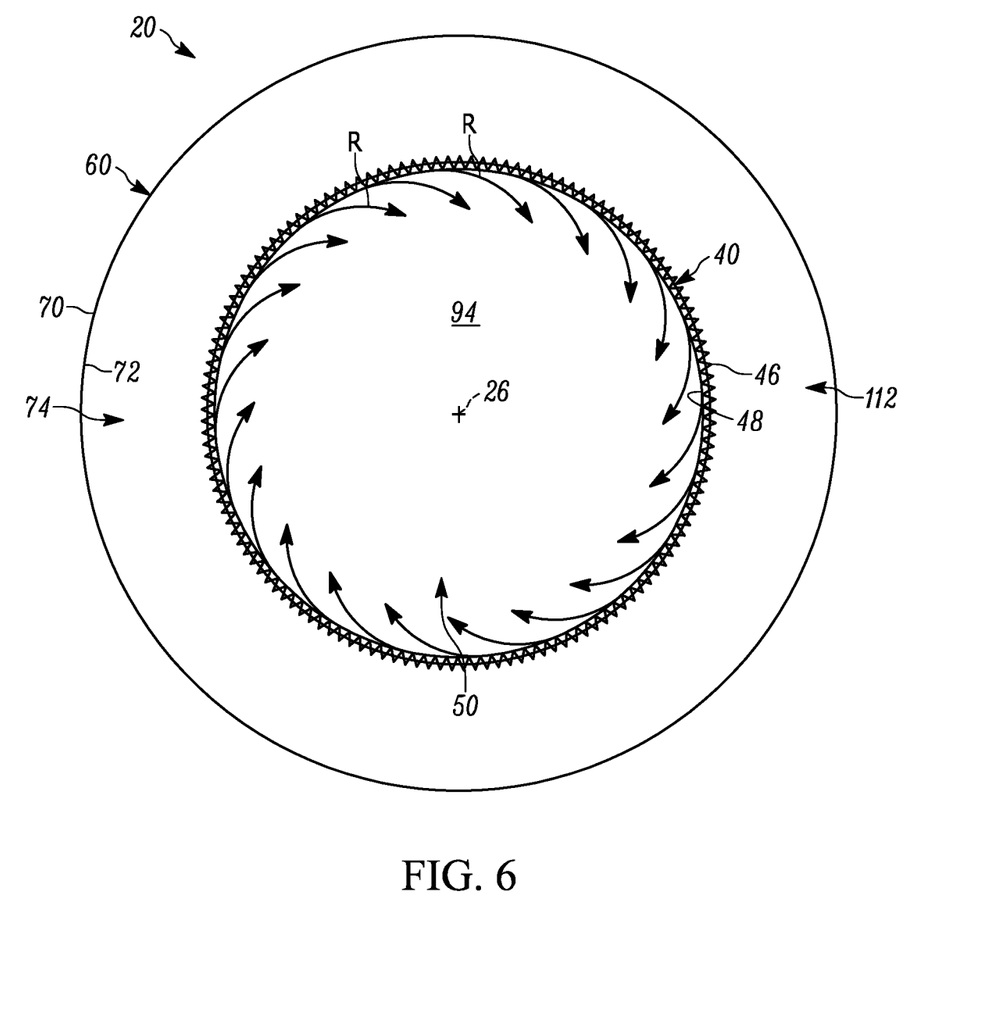
FIG. 6 is an end view of the fuel burner of FIG. 4.

As shown in FIGS. 5-6, the air/fuel mixture continues to flow in the direction D towards the second end 24 of the fuel burner 20. The air/fuel mixture flows into the fluid passage 112 and radially inward through the fluid directing structure 52, as indicated generally at $D_2$, in the inner tube 40 and towards the central passage 50. The seal between the cap 120 and the outer tube 60 prevents the air/fuel mixture from exiting the fluid passage 112 in a manner other than through the openings 54 in the inner tube 40. The air/fuel mixture impacts the guides 56 and is deflected in a direction that is offset from the central axis 26 of the fuel burner 20 and angled relative to the axis 59 normal to the inner surface 48 of the inner tube 40. The guides 56 deflect the air/fuel mixture such that the air/fuel mixture is imparted with a centrifugal force that creates rotational dynamic forces within the central passage 50 of the inner tube 40.

Since the fluid directing structure 52, i.e., the openings 54 and guides 56, extend around the entire periphery of the inner tube 40 the air/fuel mixture within the central passage 50 is forced in a direction/manner indicated by the arrow R, which is transverse to the central axis 26 of the fuel burner 20. Consequently, the air/fuel mixture within the central passage 50 undergoes a rotational, spiraling effect relative to the central axis 26 of the fuel burner 20. Alternatively, the guides 56 can be configured to force the air/fuel mixture in a direction opposite to the direction R (not shown).

The rotating, spiraling air/fuel mixture is ignited by an ignition device (not shown) of any number of types well known in the art and positioned in any number of suitable locations to light the fuel burner 20. In one example, the igniter is positioned adjacent the second end 24 of the fuel burner 20 (not shown). In another example, the igniter is secured to and extends through the blocking member 94 into the central passage 50, i.e., the igniter extends to the downstream side of the blocking member. Flame proving means (not shown) can be positioned in any number of suitable locations to detect the presence of flame.

The blocking member 94 and actuator 90 cooperate with a controller 98 connected to the actuator to form the port area adjustment device 100. The device 100 controls the amount or percentage of the total flow area through the fluid directing structure 52 capable of supplying the pre-mixed mixture of air and fuel to the igniter. More specifically, the blocking member 94 blocks/prevents a predetermined number of openings 54 along the length of the inner tube 40 from delivering the air/fuel mixture to the igniter.

FIG. 5 shows the blocking member 94 in a first axial position along the length of the inner tube 40 radially aligned with the portion 43 at the first end 42. The blocking member 94 is therefore positioned in a fully retracted position at a length $L_1$ from the axial extent of the second end 44 of the inner tube 40. In this position, the blocking member 94 is located axially to the right (as shown in FIG. 5) of every fluid directing structure 52 and associated opening 54 on the inner tube 40.

As a result, any air/fuel mixture entering the fluid passage 112 can flow through any of the openings 54/fluid directing structure 52 along the length of the inner tube 40 and into the central passage 50 to be ignited. Placing the blocking member 94 in the fully retracted position therefore maximizes the port area/port loading of the fuel burner 20 by using the entire total flow area of the fluid directing structure 52 to deliver the air/fuel mixture to the central passage 50. Consequently, the blocking member 94 is placed in the fully retracted position when Btu input demand is the highest.

Figure 7:
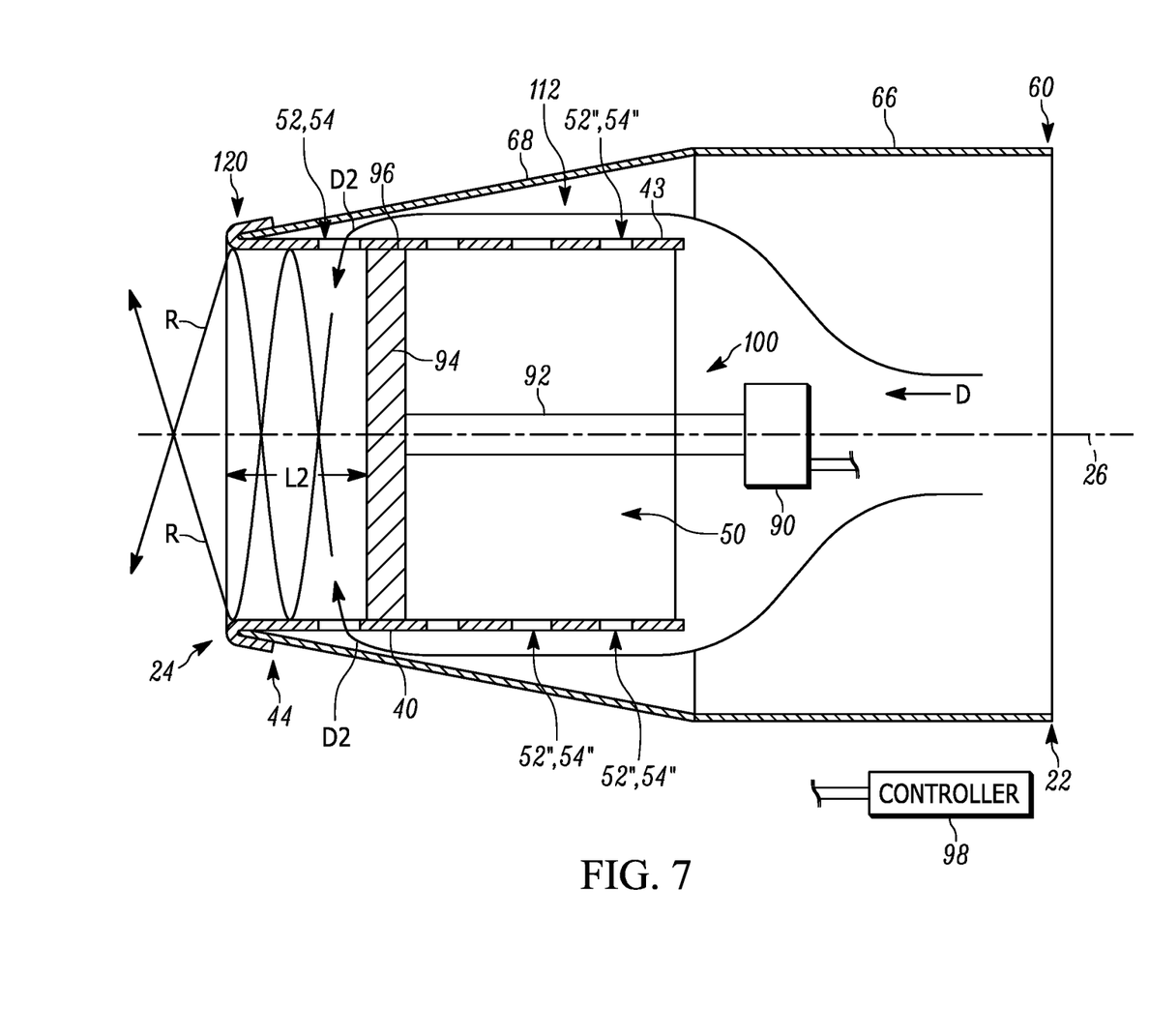
FIG. 7 is a section view of FIG. 4 taken along line 5-5 with the port area adjusting device in a second condition.

When the Btu input demand is reduced, the actuator 90 is actuated/energized to axially extend the blocking member 94 in the direction D through the central passage 50. As the blocking member 94 moves in the direction D, the number of openings 54/fluid directing structure 52 that can direct the incoming air/fuel mixture to the downstream side of the blocking member 94 is reduced. To this end, FIG. 7 shows the blocking member 94 in a fully extended position at a length $L_2$ from the axial extent of the second end 44 of the inner tube 40. In this position, the blocking member 94 is located axially to the right (as shown in FIG. 6) of one set of openings 54/fluid directing structure 52 but axially to the left of the remaining openings/fluid directing structure (designated at 52", 54" in FIG. 7 for clarity).

In this configuration, when the air/fuel mixture enters the fluid passage 112, the portion of the mixture entering the fluid passage 112 and then passing through the openings 54 to the left of the blocking member 94 freely passes into the central passage 50 downstream of the blocking member and is ignited. The remainder of the air/fuel mixture, however, that passes through the openings 54"/fluid directing structure 52" to the right of the blocking member 94 is trapped upstream/behind the blocking member within the central passage 50 and cannot be ignited in this location.

Rather, this portion of the mixture flows radially outward back out the openings 54" to the fluid passage 112 and then further downstream to the openings 54/fluid directing structure 52. The openings 54/fluid directing structure 52 would then direct the mixture into the central passage 50 downstream of the blocking member 94 to be ignited. Placing the blocking member 94 in the fully extended position therefore minimizes the port area/port loading of the fuel burner 20 by using the smallest percentage of the total flow area of the fluid directing structure 52 to deliver the air/fuel mixture to the central passage 50. Consequently, the blocking member 94 is placed in the fully extended position when Btu input demand is the lowest.

It will be appreciated that the blocking member 94 can have the axial length shown in FIG. 5 capable of covering openings 54 at a single axial location or could be longer to simultaneously cover openings along a predetermined axial length of the inner tube 40, i.e., cover multiple circumferential rows of openings 54 (not shown).

In any case, any residual air/fuel mixture still present upstream of the blocking member 94 and within the passage 50 can be vented by reversing the actuator 90. More specifically, moving the blocking member 94 in the direction opposite the direction D (towards the first end 42 of the inner tube 40) forces the static air/fuel mixture radially outward through the openings 54"/fluid directing structure 52" to the right of the blocking member. The air/fuel mixture can then move downstream to the openings 54/fluid directing structure 52 and thereafter back to the passage 50 downstream of the blocking member 94.

The actuator 90 can move the blocking member 94 to any axial position between the fully extended and fully retracted positions depending on the desired Btu load and can be done manually or in response to one or more sensed burner conditions. More specifically, the controller 98 can continuously receive feedback or signals from sensors (not shown) positioned along the burner 20 for monitoring burner conditions, e.g., air/fuel mixture flow rate, flame temperature, etc., as well as signals from the appliance indicative of the Btu demand requested of the burner. The controller 98, in response to the sensor signals, can actuate the actuator 90 to axially move the blocking member 94 to the position that produces a desired burner 20 output. This allows the controller 98 to continually vary the axial position of the blocking member 94 as needed to maintain a desired burner 20 output.

The axial position of the blocking member 94 dictates the percentage of the fluid directing structure 52 that is blocked/obstructed and thereby prevented from delivering the air/fuel mixture downstream of the blocking member to be ignited. In one example, the blocking member 94 blocks 0% of the fluid directing structure 52 and therefore 0% of the total flow area when in the fully retracted position. The blocking member 94 blocks a significant percentage, e.g., greater than 50% but less than 100%, of the fluid directing structure 52 and therefore a significant percentage of the total flow area when in the fully extended position.

Any blocking member 94 position between the fully retracted and fully retracted positions will therefore result in a nonzero percentage of the fluid directing structure 52 being blocked, i.e., a nonzero percentage of the total flow area being blocked. That said, as the blocking member 94 is moved closer to the second end 44 of the inner tube 40, the volume of air/fuel mixture passing through the fluid directing structure 52 to be ignited is reduced.

Moreover, since combustion takes place within the inner tube 40, axially moving the blocking member 94 also adjusts the volume of the combustion chamber—delimited radially by the inner tube and axially by the blocking member 94 and axial extent of the second end 24 of the fuel burner 20.

Figure 8:
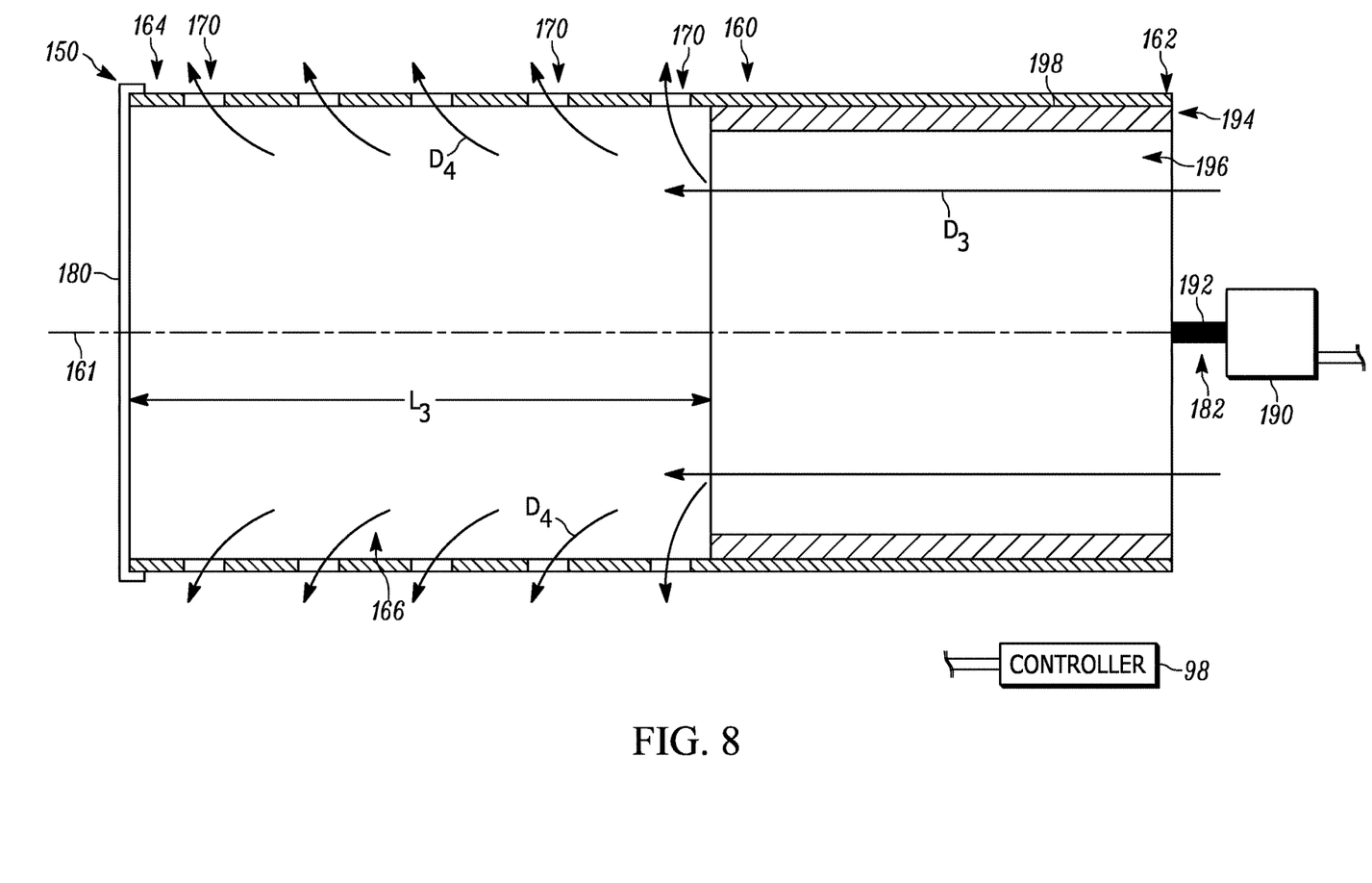
FIG. 8 is a section view of another example fuel burner including a port area adjusting device in a first condition.
Figure 9:
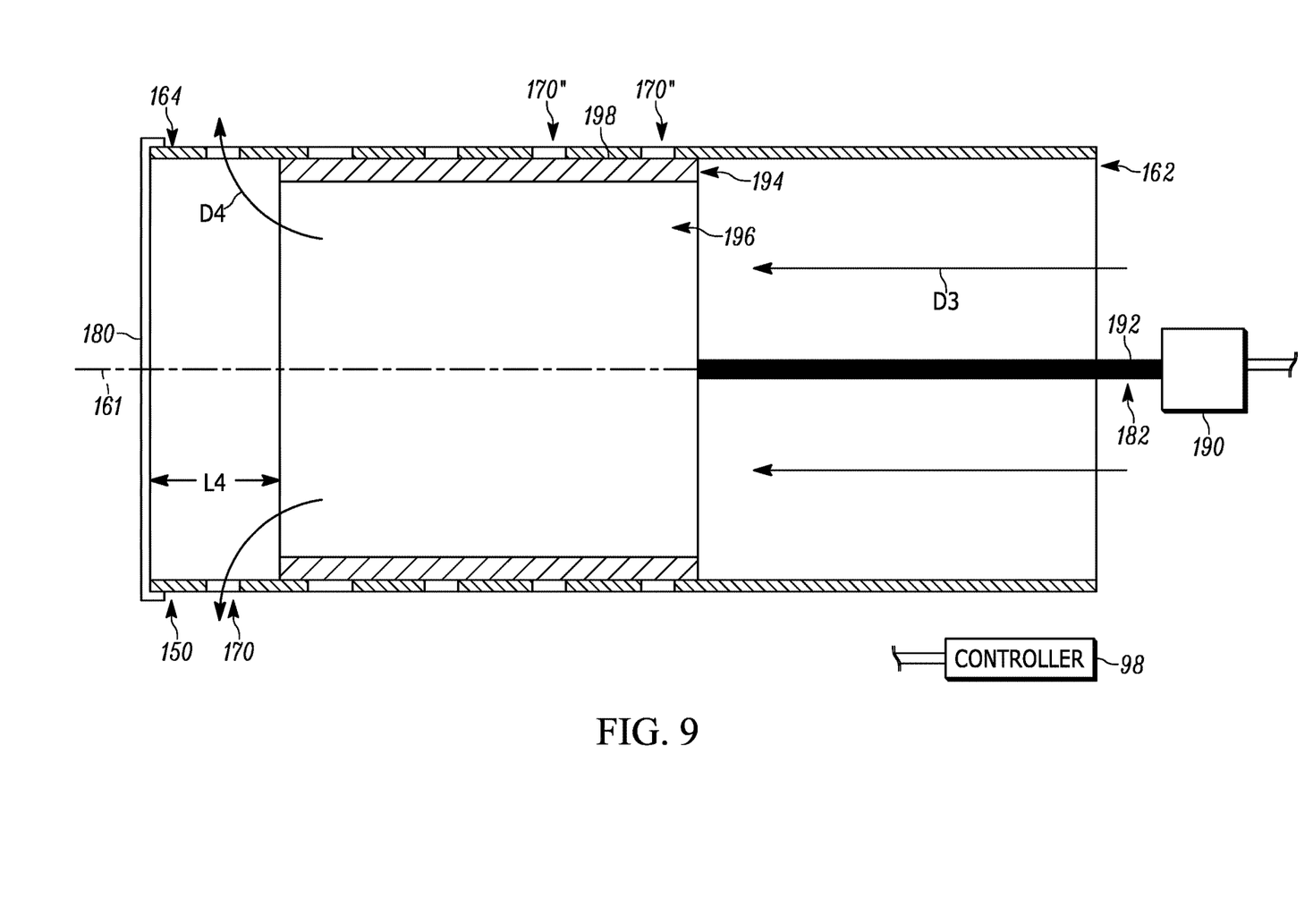
FIG. 9 illustrates the fuel burner of FIG. 8 with the port area adjusting device in a second condition.

FIGS. 8-9 illustrate another example fuel burner 150 formed as a can style premix burner. In this configuration, the mixture of air and fuel is mixed upstream of the burner 150 and delivered axially to the interior thereof in the direction/manner indicated at $D_3$. The fuel burner 150 can operate in conjunction with a blower (not shown) downstream from the fuel burner that creates negative pressure to draw the air/fuel mixture into the fuel burner in the direction $D_3$.

The burner 150 includes a single tube 160 extending along a centerline 161 from a first end 162 to a second end 164. A central passage 166 extends the entire length of the tube 160. A plurality of ports or openings 170 extend radially through the wall of the tube 160 towards the centerline 161 and into the central passage 166. The openings 170 are spaced longitudinally along the centerline 161 and circumferentially spaced about the centerline in any desired configuration. The openings 170 are located closer to the second end 164 of the tube 160 than the first end 162. The openings 170 can extend straight through the tube 160 wall or extend at an angle relative thereto.

In any case, the openings 170 act as fluid directing structure for directing the premixed mixture of air and fuel radially outward about the circumference of the tube 160. That said, the openings 170 define a total flow or port area through which the air/fuel mixture can flow radially outward along the entire length and circumference of the tube 160 to be ignited.

An end wall 180 is secured to the second end 164 of the tube 160 and seals the second end such that all or substantially all of the fluid flowing through the passage 166 from the first end 162 can only exit the tube 160 by flowing radially outward through the openings 170. The end wall 180 can seal the second end 164 of the tube 160 in a gas-tight manner, a fluid-tight manner or in a manner that allows for a small percentage of fluid leakage through the interface, e.g., less than about 10% or less than about 1% of the fluid flow.

The fuel burner 150 includes a port area adjustment device 182 that controls the amount or percentage of openings 170 through which the premixed mixture can flow to ultimately reach the igniter. The device 182 includes the controller 98, a linear actuator 190, and a blocking member 194 secured to the actuator by a rod 192. The blocking member 194 can be formed as a hollow, cylindrical sleeve. The blocking member 194 is initially positioned within the passage 166 at the first end 162 of the tube 160. The blocking member 194 includes an outer surface 198 forming a seal with the inner surface of the tube 160. A passage 196 extends the entire length of the blocking member 194. A portion of the blocking member 194 can be open or ported (not shown) to maintain the ignition and/or flame sensing relationship of the fuel burner 20.

The controller 98 actuates the actuator 190 to control the axial position of the blocking member 194 within the passage 166 in response to sensed burner 150 conditions, e.g., air/fuel mixture flow rate, flame temperature, etc., as well as signals from the appliance indicative of the Btu demand requested of the burner. This selectively blocks or covers a predetermined number of openings 170 to prevent the premixed mixture from flowing therethrough to the igniter.

Referring to FIG. 8, the blocking member 194 is shown in a first axial position along the length of the tube 160, e.g., radially aligned with the first end 162. The blocking member 194 is therefore positioned in a fully retracted position at a length $L_3$ from the axial extent of the second end 164 of the tube 160. In this position, the blocking member 194 is located upstream (axially to the right as shown in FIG. 8) of every opening 170 in the tube 160. Consequently, any air/fuel mixture entering the passage 196 in the general direction/manner $D_3$ flows through the blocking member 194, into the passage 166, and radially outward through all the openings 170 in the general direction/manner $D_4$ to be ignited. Placing the blocking member 194 in the fully retracted position therefore maximizes the port area/port loading of the fuel burner 150 by using the entire total flow area of the openings 170 to deliver the air/fuel mixture to the igniter. The blocking member 194 is therefore placed in the fully retracted position when the Btu input demand is the highest.

When the Btu demand is reduced, the controller 98 actuates the actuator 190 to axially extend the rod 192 to move blocking member 194 in the direction $D_3$ through the passage 166. As the blocking member 194 moves in the direction $D_3$, the number of openings 170 that can direct the incoming air/fuel mixture radially outward to the igniter is reduced. To this end, FIG. 9 shows the blocking member 194 in a fully extended position at a length $L_4$ from the axial extent of the second end 164 of the tube 160.

In this position, the blocking member 194 is located upstream (axially to the right as shown in FIG. 9) of one set of openings 170. The blocking member 194, however, is radially aligned with the remaining openings (designated at 170" in FIG. 9 for clarity). In other words, the blocking member 194 covers or obstructs multiple circumferential rows of openings 170 in the tube 160 when in the fully extended position.

In this configuration, the air/fuel mixture enters the fuel burner 150 in the general direction $D_3$. The air/fuel mixture then flows through the passage 166 upstream of the blocking member 194 and entirely through the blocking member via the passage 196. From there, the air/fuel mixture flow back into the passage 166 downstream of the blocking member 194 and adjacent the end wall 180, and finally flows radially outward through the exposed openings 170 in the direction $D_4$ to be ignited. The openings 170", however, are completely obstructed by the blocking member 194 and, thus, no air/fuel mixture can flow therethrough to be ignited.

Placing the blocking member 194 in the fully extended position therefore minimizes the port area/port loading of the fuel burner 150 by using the smallest percentage of the total flow area of the openings 170 to deliver the air/fuel mixture radially outward to the igniter. Consequently, the blocking member 194 is placed in the fully extended position when Btu input demand is the lowest.

The controller 98 can control the actuator 190 to move the blocking member 194 to any location between the fully extended and fully retracted positions depending on the desired Btu load and can be done manually or in response to one or more sensed burner conditions. The axial position of the blocking member 194 dictates the percentage of the openings 170 that are blocked/obstructed and thereby prevented from delivering the air/fuel mixture radially outward of the tube 160 to the igniter.

In one example, the blocking member 194 blocks 0% of the openings 170 and therefore 0% of the total flow area when in the fully retracted position. The blocking member 194 blocks a significant percentage, e.g., greater than 50% but less than 100%, of the openings 170 and therefore a significant percentage of the total flow area when in the fully extended position.

Any blocking member 194 position between the fully retracted and fully retracted positions will therefore result in a nonzero percentage of the openings 170 being blocked, i.e., a nonzero percentage of the total flow area being blocked. That said, as the blocking member 194 is moved closer to the second end 164 of the tube 160, the volume of air/fuel mixture passing through the openings 170 to be ignited is reduced.

It is clear from the above that the fuel burners described herein are advantageous in that the blocking member can be readily moved to a position that only allows the air/fuel mixture to exit through enough of the porting/fluid directing structure/openings to maintain the proper loading.

The preferred embodiments of the invention have been illustrated and described in detail. However, the present invention is not to be considered limited to the precise construction disclosed. Various adaptations, modifications and uses of the invention can occur to those skilled in the art to which the invention relates and the intention is to cover hereby all such adaptations, modifications, and uses which fall within the spirit or scope of the appended claims.

The invention claimed is:

1. A fuel burner comprising:
a tube extending along an axis from a first end to a second end and including a central passage and fluid directing structure for directing a mixture of air and combustible fuel radially through the tube, the fluid directing structure collectively defining a total flow area; and
a blocking member longitudinally movable along the axis and within the central passage between a first condition blocking a first percentage of the total flow area and a second condition blocking a second percentage of the total flow area different from the first percentage to control the flow of the mixture of air and combustible fuel through the fluid directing structure from the first end to the second end of the tube to be ignited.

2. The fuel burner recited in claim 1, wherein the first percentage is zero and the second percentage is nonzero.

3. The fuel burner recited in claim 1 further comprising an actuator for axially moving the blocking member and a controller connected to the actuator.

4. The fuel burner recited in claim 3, wherein the controller actuates the actuator to axially move the blocking member in response to sensed conditions of the fuel burner.

5. The fuel burner recited in claim 1, wherein the blocking member is cylindrical and forms a substantially fluid-tight seal with the tube.

6. The fuel burner recited in claim 1, wherein the blocking member has an axial length configured to block fluid directing structures having different axial positions along the tube.

7. The fuel burner recited in claim 1, wherein the mixture is pre-mixed upstream of the tube.

8. The fuel burner recited in claim 1 having an output of at least 1M Btu.

9. The fuel burner recited in claim 1, wherein the fluid directing structure directs the mixture of air and fuel radially outward of the tube to be ignited.

10. The fuel burner recited in claim 1, wherein the fluid directing structure directs the mixture of air and fuel radially inward into the central passage of the tube to be ignited.

11. The fuel burner recited in claim 1, wherein the tube comprises an inner tube and the fuel burner further comprises an outer tube positioned around the inner tube and extending along a central axis with an outer surface and an inner surface defining a passage, wherein a fluid passage is defined between an outer surface of the inner tube and the inner surface of the outer tube, the fluid passage being supplied with the mixture of air and combustible fuel, the fluid directing structure directing the mixture from the fluid passage to the central passage such that the mixture rotates radially about the central axis.

12. A fuel burner comprising:
an outer tube extending along a central axis and having an outer surface and an inner surface defining a passage;
an inner tube positioned within the passage of the outer tube and having an outer surface and an inner surface defining a central passage, wherein a fluid passage is defined between the outer surface of the inner tube and the inner surface of the outer tube, the fluid passage being supplied with a mixture of air and combustible fuel, the inner tube having fluid directing structure for directing the mixture from the fluid passage to the central passage such that the mixture rotates radially about the central axis, the fluid directing structure defining a total flow area; and
a blocking member longitudinally movable along the axis and within the central passage between a first condition blocking a first percentage of the total flow area and a second condition blocking a second percentage of the total flow area different from the first percentage.

13. The fuel burner recited in claim 12, wherein the first percentage is zero and the second percentage is nonzero.

14. The fuel burner recited in claim 12 further comprising an actuator for axially moving the blocking member and a controller connected to the actuator.

15. The fuel burner recited in claim 14, wherein the controller actuates the actuator to axially move the blocking member in response to sensed conditions of the fuel burner.

16. The fuel burner recited in claim 12, wherein the blocking member is cylindrical and forms a substantially fluid-tight seal with the inner tube.

17. The fuel burner recited in claim 12, wherein the blocking member had an axial length configured to block fluid directing structures having different axial positions along the inner tube.

18. The fuel burner recited in claim 12, wherein the mixture is pre-mixed upstream of at least one of the inner tube and the outer tube.

19. The fuel burner recited in claim 12 having an output of at least 1M Btu.

* * * * *